United States Patent Office 2,900,015
Patented Aug. 18, 1959

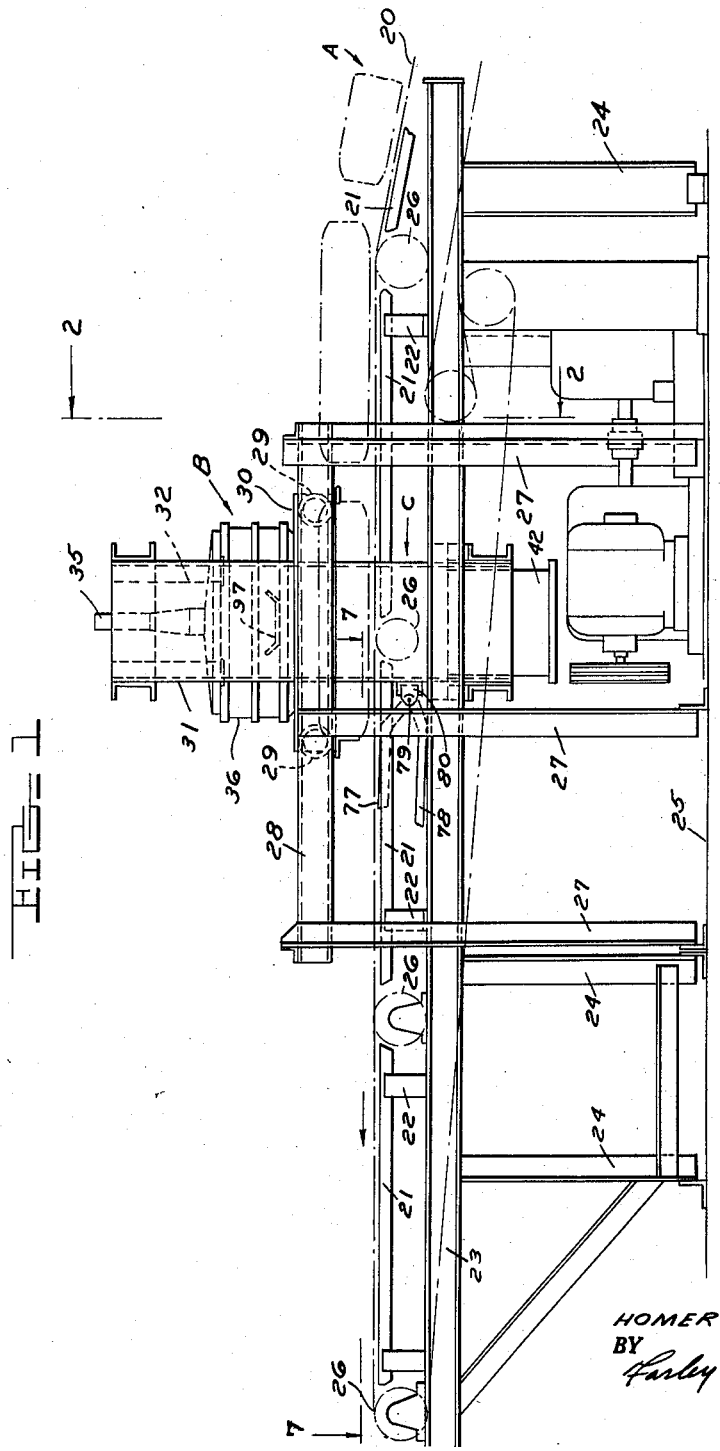

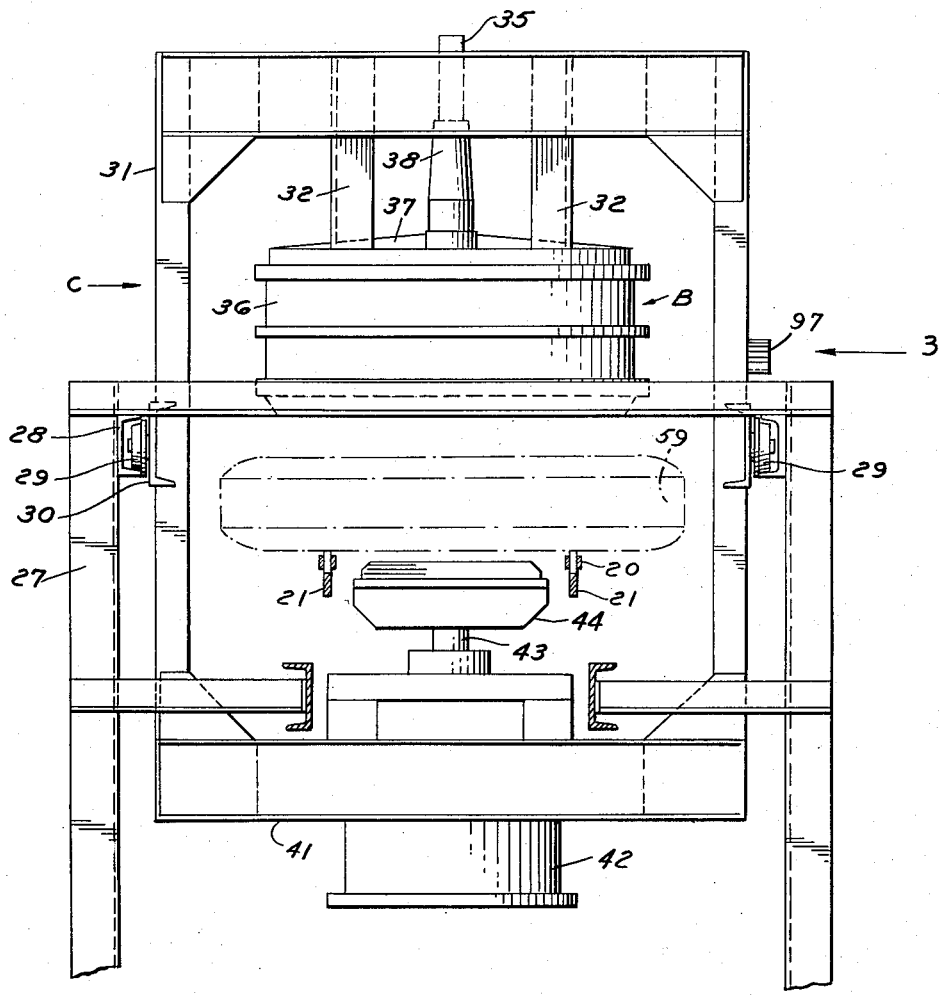

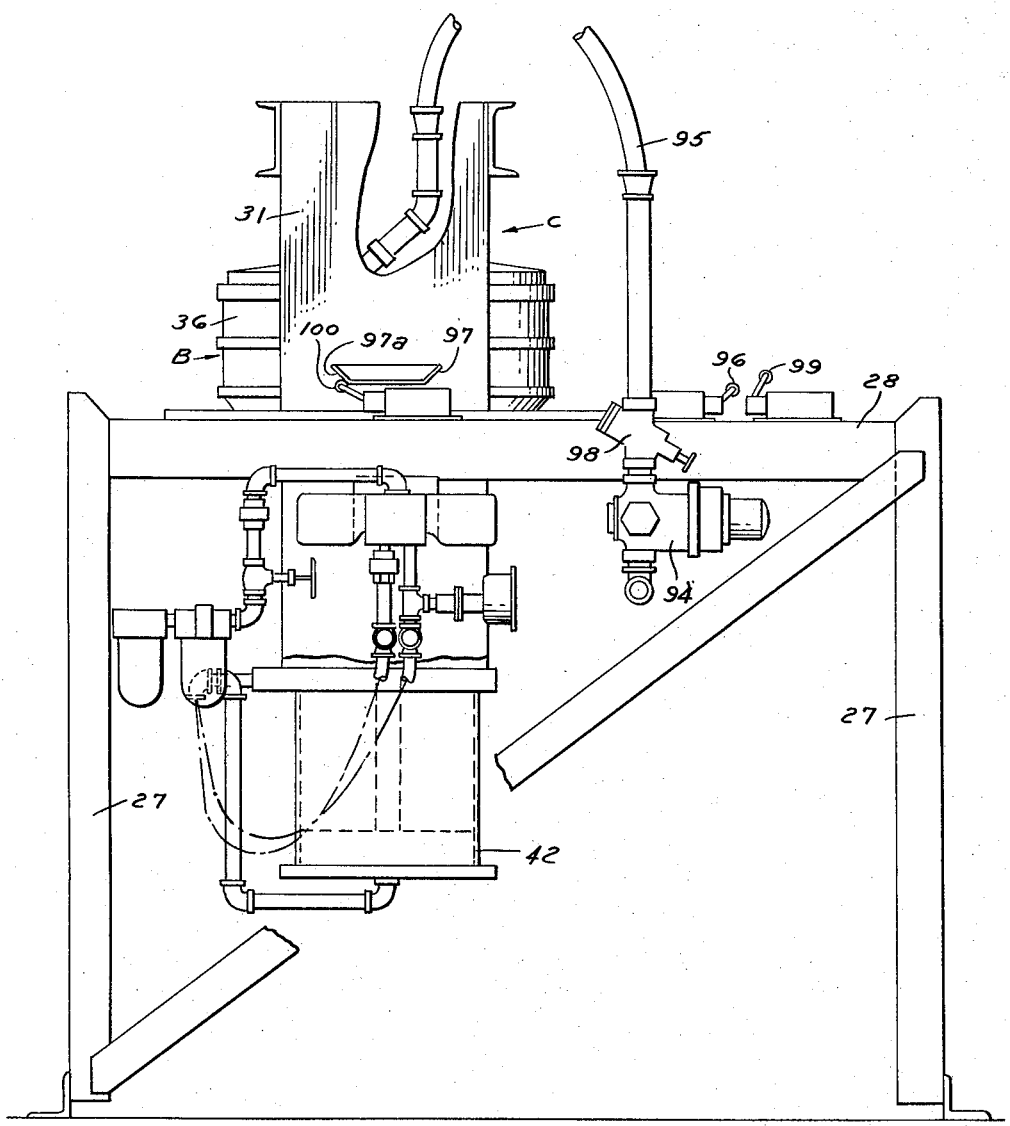

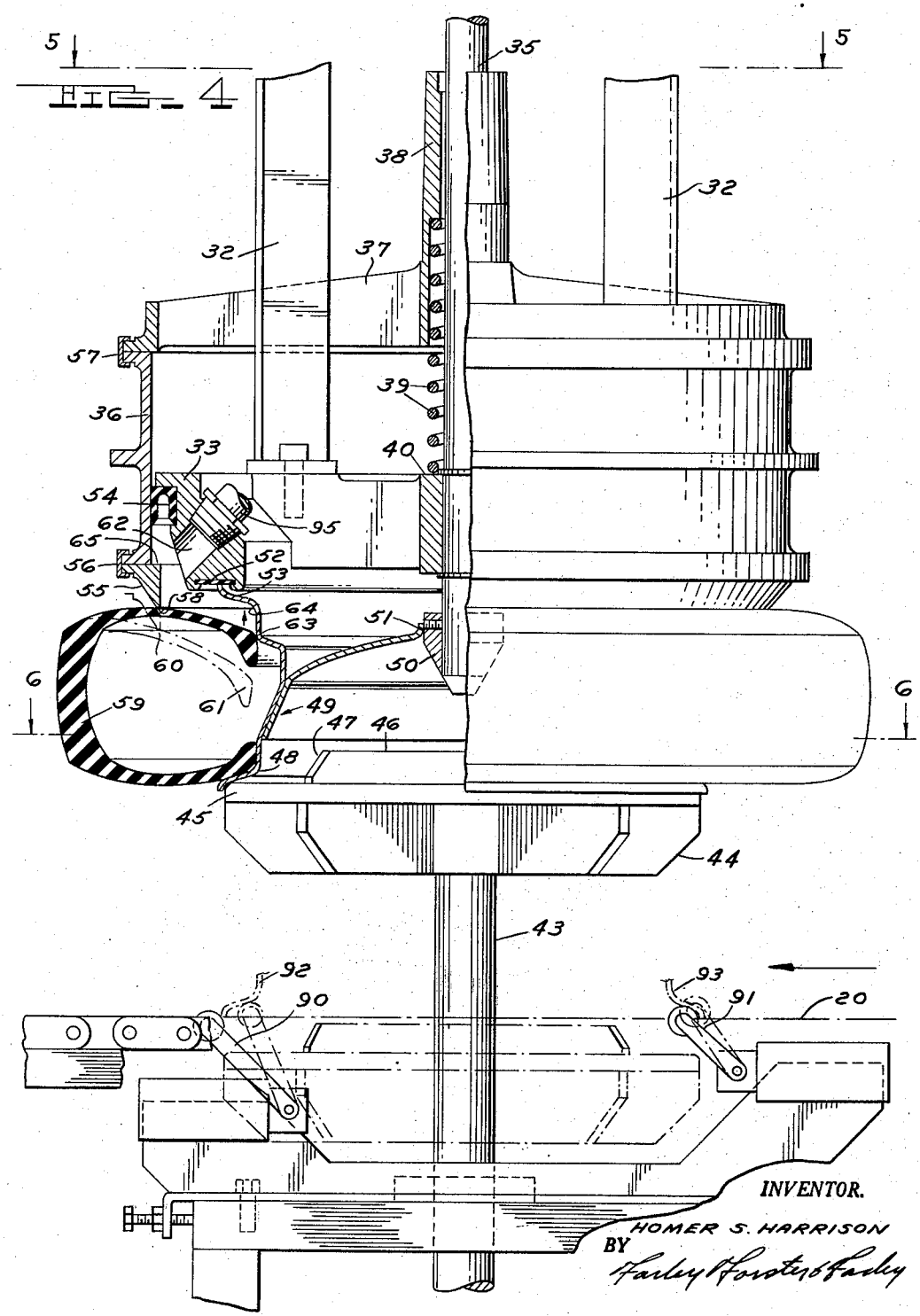

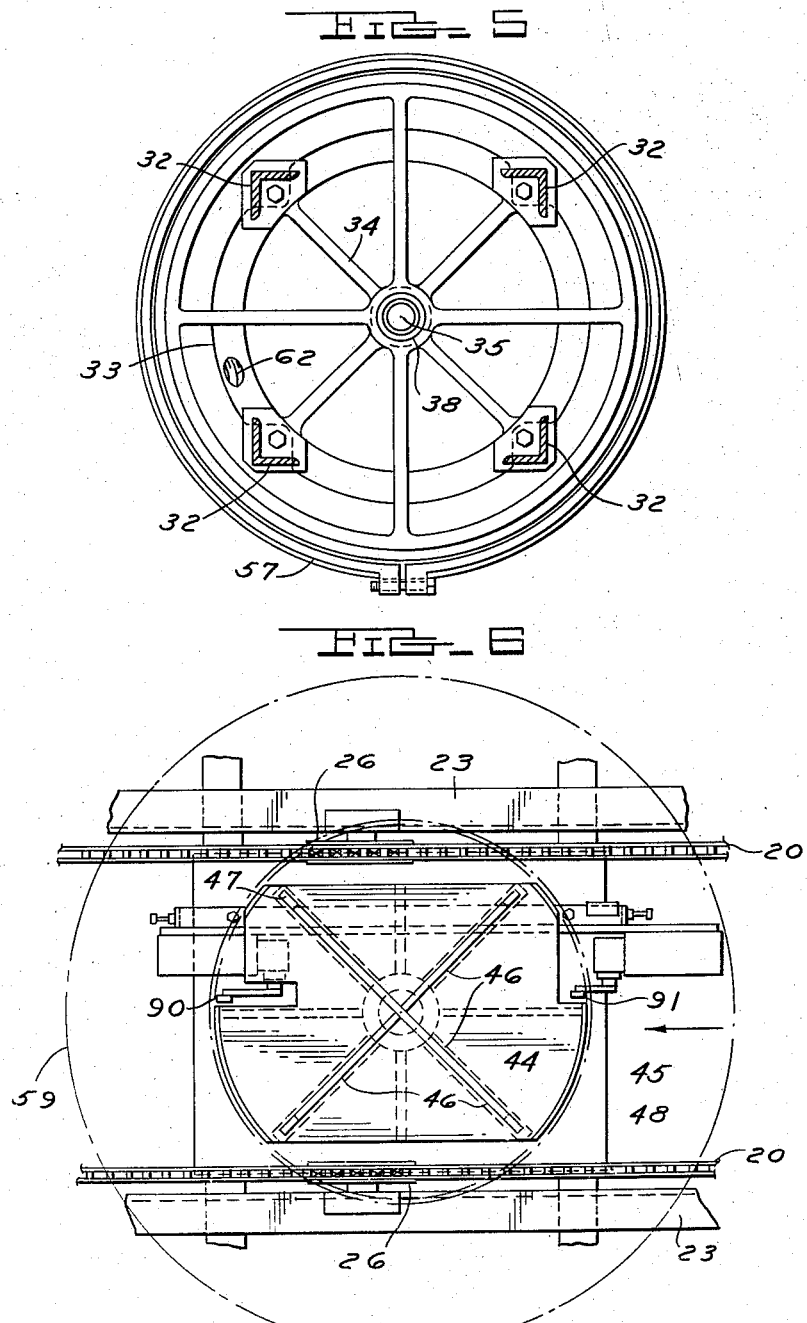

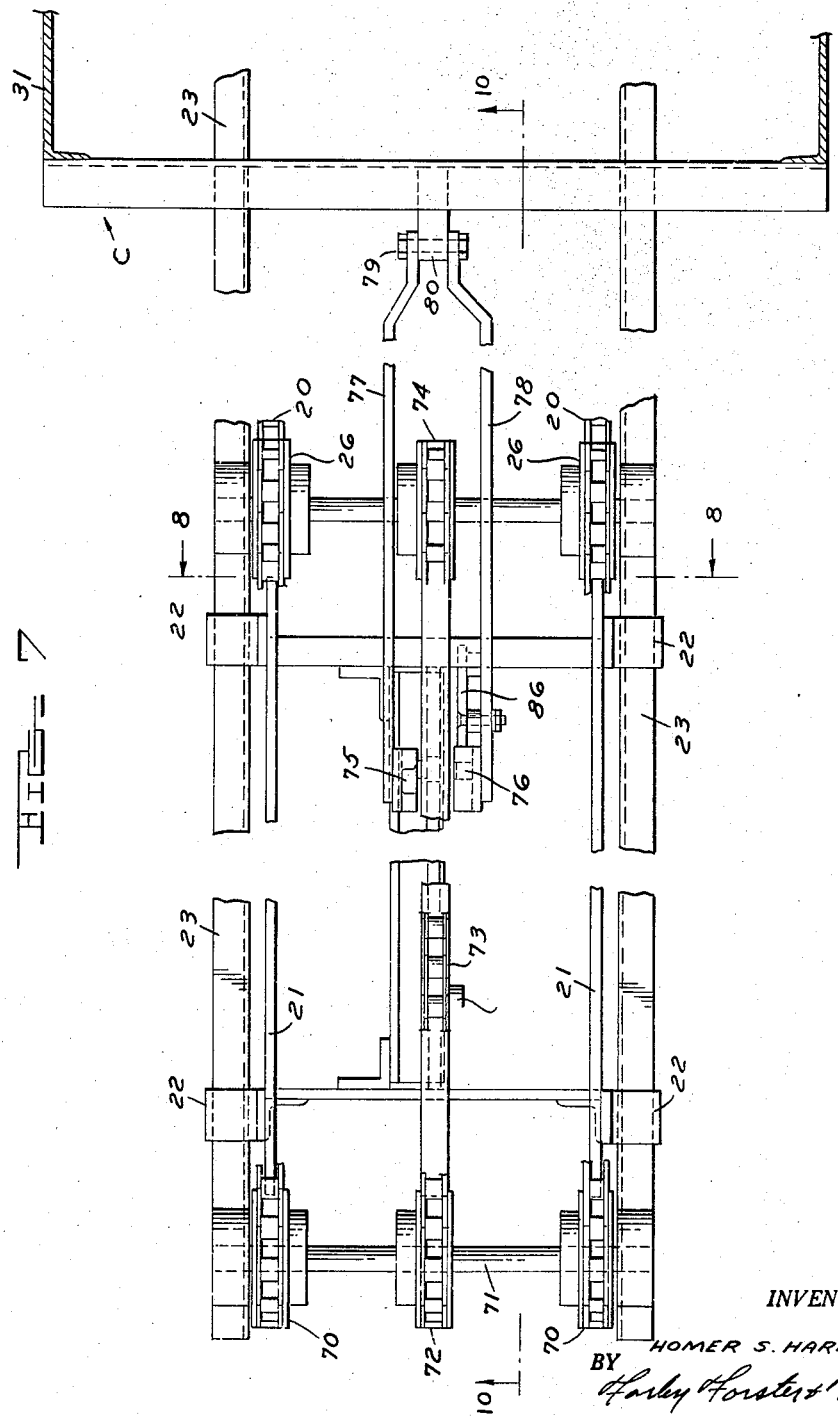

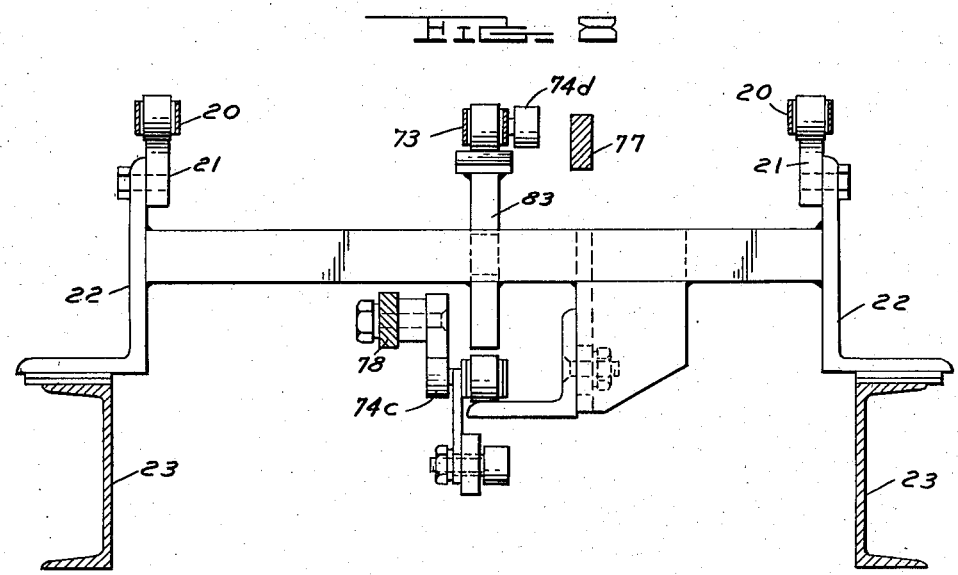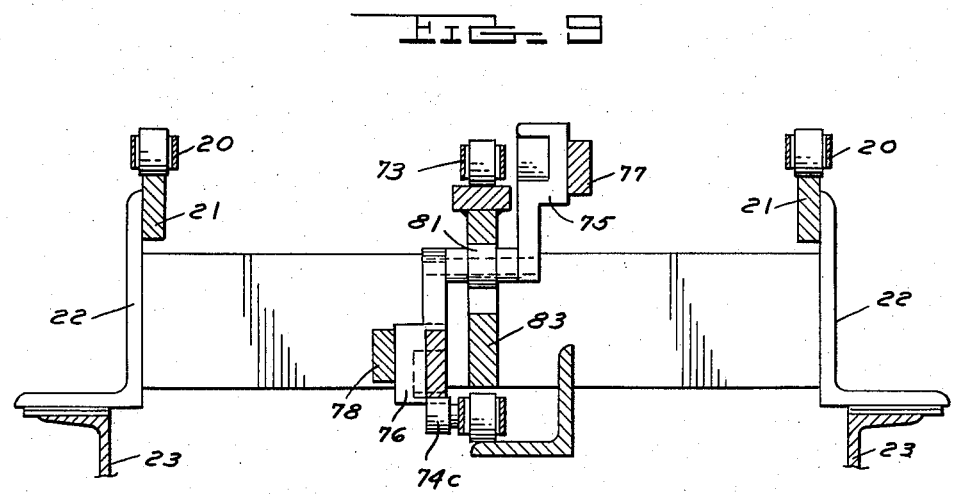

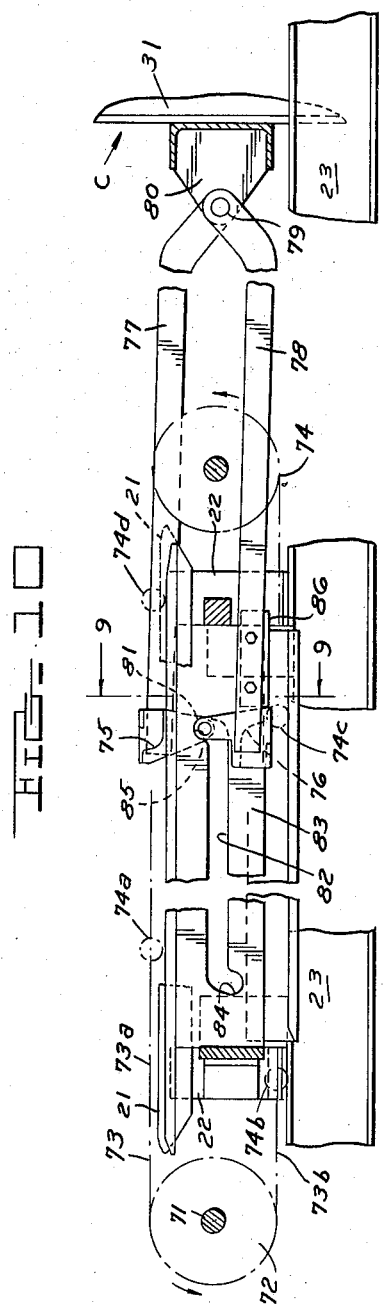

2,900,015

AUTOMATIC TUBELESS TIRE BEAD SEATING AND INFLATING MACHINE

Homer S. Harrison, Detroit, Mich., assignor to Allied Steel and Conveyors, Inc., Detroit, Mich., a corporation of Michigan Application March 10, 1955, Serial No. 493,344

16 Claims. (Cl. 157—1.1)

This invention relates to a tubeless tire inflating machine.

The adoption of tubeless tires for standard automotive production depended in no small measure upon the development of suitable reliable production tire inflating means. Conventional tire inflating apparatus in use in assembly plants which involved inflation through valve stems was not suitable for tubeless tires in the absence of special preliminary means for setting of the tire beads on both wheel flanges sufficiently to provide an air seal in the absence of which the relatively small flow through the valve stem was merely exhausted through any open gap between the tire bead and wheel flange. The problem was particularly acute whenever due to stacking of tires or otherwise the tire beads assumed a temporary relaxed set narrower than the sealing flanges on the wheel.

Various unsuccessful attempts were made to provide automatic mechanical apparatus for squeezing the tread of the tire along the outer circumference or otherwise to cause the tire beads to bulge outwardly into sealing contact with the wheel flanges until an initial sealing inflation could be effected. Other approaches were made to inject a relatively low pressure (5 p.s.i. was adequate) inside the tire rapidly in order to set the beads depending on conventional stem inflation apparatus to complete the inflation to required final pressure. Thus, numerous devices were designed with large air capacity blown in between the bead and flange at one or more points in an attempt to inflat to a bead seating pressure faster than the air could escape through other openings.

The present apparatus developed on the principle of inflating between the tire bead and wheel flange around the entire perimeter of the wheel, proved highly successful not only in providing an initial bead set but also as a means for extremely rapid inflation all the way up to final tire pressure. The success of the present solution to an industry-wide problem which was long unsolved is testified to by the fact that machines of the design disclosed herein have been adopted by virtually the entire automotive industry with more than 90% of all tubeless tire inflation in production assembly plants now employing such apparatus.

In general, the inflating apparatus includes a vertical cylinder having a relatively thin lower edge adapted to bear downwardly on the side wall of a tire at a position intermediate the bead and the tread thereof, such contact serving the double purpose of providing an air seal and holding the bead of the tire away from its seating flange, an internal ring having a suitable annular sealing surface for engaging the metal rim of the wheel, a suitable air seal between the ring and cylinder, and means for introducing air pressure rapidly through the ring. Essentially, such apparatus involves the provision of four main annular air seals including the lower tire beads against the wheel flange (a seal readily established by the weight of the tire and inflating cylinder), a seal between the cylinder and the upper tire casing, a seal between the ring and the wheel rim, and a seal between the ring and the cylinder thereby defining a completely enclosed air chamber communicating with the radially inner portion of the exterior side wall and with the interior of the tire through the entire annular opening between wheel flange and tire bead. Air pressure introduced within such chamber of course acts equally on both sides of the tire casing within the periphery of the cylinder bearing against such casing but pressure within the tire operating on that area of the casing radially exterior of the periphery of the sealing edge of such cylinder is opposed only by atmospheric pressure thereby permitting initial inflation to raise the cylinder until the tire bead comes into sealing contact with the wheel flange.

One of the problems encountered in the development of this apparatus was that of raised letters on the side wall of the tire interfering with a proper seal between the lower edge of the cylinder and the tire casing. This was overcome by providing a relatively thin edge contact (in the order of 1/16 of an inch) together with means for pressing downwardly against the tire casing with considerable force. Initially, an attempt was made to utilize the weight of the cylinder itself to cause the thin lower edge of the cylinder to flatten any raised letters or insignia contacted thereby. However, such attempt met with a further problem, namely that of pressing the two beads of the tire together into a substantially sealing contact such as to preclude air pressure from building up within the tire. Accordingly, it became apparent that the lowermost position of the cylinder must be limited to a position which would not press the tire beads together and that other means should be provided to prevent excessive leakage past any lettering on the tire side wall. This was accomplished by providing a contact edge for the cylinder of smaller diameter than the main cylinder wall such as to provide an area for pressure to operate upon forcing the cylinder into increasingly firm engagement with the tire casing as opposing pressure built up within the tire. This latter differential area means for exerting supplemental pressure between the cylinder and tire casing was also found useful to increase the internal tire pressure at which the upper bead would rise into a sealing contact with the wheel flange. Through a proper balancing of the mentioned internal cylinder area and the position of the cylinder contact edge relative to the extremities of a side wall, an adequate and accurate pressure could be built up within the tire at the time sealing contact was established between the upper bead and the wheel such that when pressure was thereafter released on the entire outside surface of the side wall within the cylinder, the pressure within the tire would firmly seat the upper bead in its final position against the wheel flange and provide a fully inflated tire.

Since the rate of inflation by this means was so fast (in the order of one second to completely inflat the tire) as compared to all prior means of inflating through relatively restricted valve stems, it become possible to abandon the prior practice of providing a tire inflating machine having multiple stations to permit simultaneous inflation of numerous tires and to provide instead a single station inflating machine capable of handling production requirements of 500 or more tires per hour.

Accordingly, it is the principal object of the present invention to provide a tubeless tire inflating machine capable of effectively setting the beads in sealing relationship with the wheel flanges.

Another object is to adapt such machine to fully inflate the tire.

Another object is to provide a tubeless tire inflating machine adapted to effect inflation by passing air between a tire bead and its wheel flange.

Another object is to adapt such machine to hold the bead off of the flange until sufficient air has been introduced within the tire to produce complete inflation thereof when the bead is fully seated.

Another object is to provide a sealing ring for contacting the side wall of a tire intermediate the bead and the tread adapted to hold the bead off of the flange during inflation.

Another object is to provide a thin contacting edge for the sealing ring to facilitate flattening of any lettering or other irregularities on the side wall of a tire tending to interfere with a seal.

Another object is to provide an air cylinder directly connected to the sealing ring capable of axial displacement relative to the wheel of the tire to be inflated.

Another object is to resiliently mount such cylinder in a position capable of engaging one side wall of the tire to permit inflation between the tire bead and wheel flange without pressing such bead into sealing contact with the opposite tire bead.

Another object is to provide piston means within such cylinder capable of axial movement relative thereto having annular means for sealing against the rim of a wheel.

Another object is to provide means for clamping a wheel into sealing engagement with the annular sealing means.

Another object is to provide pressure responsive means for urging said cylinder to press the side wall away from a bead sealing position with its wheel flang.

Another object is to provide means for centralizing a wheel in the inflating machine preparatory to inflation.

Another object is to provide means for preventing a sudden release of inflating pressure upon completion of tire inflation.

Another object is to provide inflation pressure control means for accurately inflating a tire to a final required pressure.

Another object is to utilize an accumulator as a means for controlling the pressure and producing a rapid tire fill.

Another object is to provide power means for clamping a wheel in inflating position.

Another object is to provide automatic control means for actuating such power means, inflating the tire and releasing the wheel from such inflating machine.

Another object is to provide a tubeless tire inflating machine adapted for automatic operation in conjunction with a continuous wheel conveyor.

Another object is to provide means for reciprocating inflating apparatus along the path of said conveyor.

Another object is to provide means for automatically moving a tire from the conveyor into inflating position in the machine and for returning the tire to the conveyor upon completion of inflation.

Another object is to cause the inflating apparatus to move in the direction of conveyor travel during the inflation cycle and to return to a pick-up position after delivering the wheel back to the conveyor.

These and other objects will be more apparent from the following detailed description of a preferred embodiment of my invention and by reference to the drawings forming a part hereof wherein:

Fig. 1 is a side elevation of a preferred embodiment of the present tire inflating machine.

Fig. 2 is an end elevation taken along the line 2—2 of Fig. 1.

Fig. 3 is a fragmentary side elevation taken along the line 3—3 of Fig. 2 showing particularly the air pressure controls for such machine.

Fig. 4 is an enlarged fragmentary partially sectional view of the inflating apparatus per se shown in operating position.

Fig. 5 is a fragmentary plan view taken along the line 5—5 of Fig. 4.

Fig. 6 is a fragmentary plan view taken along the line 6—6 of Fig. 4.

Fig. 7 is a fragmentary plan view of the conveyor track and reciprocating mechanism taken along the line 7—7 of Fig. 1.

Fig. 8 is a fragmentary end elevation taken along the line 8—8 of Fig. 7.

Fig. 9 is a fragmentary end elevation taken along the line 9—9 of Fig. 10.

Fig. 10 is a fragmentary side elevation taken along the line 10—10 of Fig. 7.

Referring to Fig. 1, it will be seen that a preferred embodiment of the present tire inflating machine includes a wheel conveyor A, tire inflating mechanism B and a reciprocable carriage C for moving the tire inflating mechanism longitudinally of the conveyor A. The conveyor A comprises a pair of laterally spaced roller chains traveling on supporting track elements 21 mounted by suitable brackets 22 on longitudinally extending channel frame members 23 in turn supported by suitable frame members 24 resting on the floor 25. A plurality of rotatable sprockets 26 serve to engage the chain 20 and stabilize its lateral position on the supporting track 21.

An additional stationary framework supported on the floor including vertical members 27 and longitudinally extending horizontal channel tracks 28 secured thereto serve as a trackway for longitudinally and laterally spaced wheels 29 carried by longitudinal channels 30 supporting a reciprocable frame C which includes an open rectangular frame 31 from which four vertical angles 32 rigidly support an annular vertically stationary piston element 33 having a spider 34 which locates a central vertical post 35 serving as a guide for a vertically floating cylinder 36 suspended from a spider 37 having a central sleeve 38 supported by a compression spring 39 resting on the vertically stationary hub 40 of the piston element 33. The lower horizontal members 41 of the open frame 31 support a vertically stationary cylinder 42 having a piston and rod assembly 43 to the upper end of which a spider 44 is secured.

Referring now to Figs. 4, 5 and 6 which best show the detailed construction of the tubeless tire inflating device per se, it will be seen that the upper platen 45 of spider 44 carries wheel locating members 46 having angular faces 47 adapted to engage the inner flange 48 of a wheel 49 and centralize the same relative to the axis of the piston cylinder assembly 43. A conical sleeve 50 secured to the lower end of the guide post 35 is adapted to engage the inner hub 51 as the wheel is raised relative thereto to further centralize the axis of the wheel with the inflation piston ring 33. Annular rubber or similar resilient seal ring 52 is adapted to sealingly engage the rim 53 of a wheel raised into contact therewith and an annular rubber U cup 54 is adapted to provide an air seal between the piston ring 33 and inner face of the cylinder 36. At the lower end of the cylinder 36, a relatively thin-edged annular ring 55 is securely clamped by U band 56, a similar band 57 being employed to clamp the cylinder 36 to the spider head 37.

It will be seen from the above description that when a wheel with a tire loosely mounted thereon is raised by the piston rod assembly 43 into engagement with the sealing ring 52, the weight of the cylinder assembly 36, 37 floating on partially compressed spring 39 will cause the lower edge 58 of the ring 55 to depress the side wall of the tire 59 to a position such as shown in dotted line 60, the relatively thin edge 58 forming an air seal with such side wall thereby defining a closed air chamber within the tire communicating past the tire bead 61 with the annular chamber between the cylinder 36 and piston ring 33, such latter chamber being sealed from the outside by the cup seal 54 and wheel seal 52 respectively. If air pressure is now introduced through inlet port 62, the pressure acting on the inner side wall area extending radially beyond the contact edge 58 will overcome the weight of the cylinder assembly, raise the same until the tire bead establishes sealing contact as shown at 63 with the wheel preventing additional air flow to the inside of the tire. If air pressure is now exhausted through port 62, pressure within the tire acting on the now unsupported area of the tire wall within the edge 58 of the ring 55 will further raise the cylinder assembly 36, 37 and cause the bead 63 to fully seat in proper position within the wheel retaining flange 64.

It will be understood that although the last movement of the tire side wall from the initial sealing point at 63 to the finally seated position at 64 will increase the volume within the tire and correspondingly decrease the pressure, nevertheless, if air pressure has been established within the tire at the time of initial sealing at 63 sufficiently higher than required final tire pressure to compensate for the increased volume upon final bead seating, full inflation of the tire to final pressure will be effected. In this connection it will be observed that the larger the diameter of cylinder 36 relative to the tire diameter, the smaller will be the unbalanced area within the tire for pressure to operate on in raising the cylinder 36 to the position where sealing contact at 63 takes place and accordingly the higher the final pressure will be, while conversely the smaller the diameter of the cylinder 36 relative to the tire, the lower the pressure within the tire before such sealing takes place. Another means of increasing the final inflation pressure which has been found highly desirable is the provision of a shoulder annulus 65 on the ring 55 extending inwardly of the inner wall of the cylinder 36 thereby providing an area on which pressure will act to create a downward thrust supplementing the weight of the cylinder assembly. This latter pressure thrust, in addition to increasing the final inflation pressure, serves the function of improving the seal between the edge 58 and the tire side wall, as may be necessary or desirable to press down any raised lettering on the side wall which might otherwise produce substantial leakage.

As an example of specific dimensions successfully employed in commercial practice in the inflation of substantially all standard size passenger car tubeless tires, a cylinder 36 having an inside diameter of 21¾ inches is employed with a ring 55 having an inside diameter of 21¼ inches together with a lower edge 58 ⅟₁₆ inch in width. Thus, the ¼-inch shoulder 65 provides 16.88 square inches upon which air pressure produces a downward thrust distributed on a sealing area of approximately 4.18 inches thereby providing a sealing pressure of approximately 4 pounds per square inch per pound of air pressure between the tire casing and the edge of the seal ring.

As a further specific example of operating dimensions and pressures, it has been found that a 1¼-inch pipe and flexible hose leading to port 62 from a 10-cubic foot accumulator tank (not shown) having 60 pounds storage pressure supplied through a ½-inch pipe from a 90 pound per square inch source of supply pressure produces a final tire inflation pressure of 32 pounds per square inch in approximately 1 second from the time of beginning inflation. This lends itself to a complete tire inflation cycle including the raising and lowering of the wheel of approximately 3 seconds.

Such inflation takes place while the inflating device is traveling from right to left as seen in Fig. 1 on the wheeled frame C, which movement is derived from the main conveyor A by mechanism which will now be described with particular reference to Figs. 7 to 10. The purpose of providing a carriage for the inflating device is to facilitate the machine's handling of a steady flow of wheels on the conveyor 20 coming from an automatic tire mounting machine, not shown. Thus, by having each wheel continue to move during its inflation continuous travel of the incoming wheels on conveyor 20 may be accommodated without interference.

Reciprocating movement of the frame C is derived from the continuous linear movement of the conveyor A by means of sprockets 70 driven by the chains of the main conveyor 20 which in turn drive shaft 71, a central sprocket 72 and central endless chain 73 extending over the tail sprocket 74. The upper reach 73a of the chain 73 is employed for moving the frame C in the direction of conveyor travel while the lower reach 73b of such chain is employed for returning the frame C to its starting position. For this purpose, a plurality of uniformly spaced rollers such as 74a to 74d alternately connected to opposite sides of the chain 73 are respectively adapted to engage a forward driving dog 75 and return driving dog 76 which are rigidly connected, respectively, to drive bars 77 and 78 pivotally connected at 79 to a bracket 80 suitably attached to the frame C. The drive dogs 75, 76 are connected to each other and to a central roller 81 which is adapted to ride in a slotted cam track 82 in a stationary plate 83, such cam track having a downward recess 84 at the forward end and an upwardly extending recess 85 at the rearward end serving, respectively, to lower and raise the drive dogs 75 and 76 at the ends of their travel.

In the position shown in Fig. 10, the frame C has just completed its return travel and the roller 74c has come out of its engagement with the driving dog 76 as permitted by the roller 81 moving upwardly into the recess 85. Roller 74c moving along the short track 86 bolted to the drive bar 78 will serve to hold the drive dogs 75, 76 in their raised position until the roller 74d has moved into engagement with the drive dog 75 whereupon the drive dogs will drop to the main horizontal level established by the cam track 82 and the drive dog 74b will serve to propel the frame C in the direction of conveyor travel until the roller 81 drops into the recess 84 whereupon the roller 74d will leave engagement of the drive dog 75 and the roller 74a will then pick up engagement of the drive dog 76 to initiate return travel of the frame C.

After it has reached its return position and before the roller 74d has engaged the dog 75 as in the case of Fig. 10, a wheel on conveyor A will reach a position directly under the momentarily stationary inflating device. With reference to Fig. 4, as a wheel reaches such position, a pair of limit switches 90 and 91 will be simultaneously actuated by forward and aft portions 92, 93 of the wheel rim initiating the introduction of pressure into the cylinder 42 actuating the piston assembly 43 to raise the wheel into engagement with the sealing ring 52 as previously described. The two limit switches 90 and 91 are arranged in series in the actuating circuit so that the initial closing of the switch 91 by the leading edge of a wheel passing thereover will not initiate the piston movement, such limit switch being released before the leading edge of the wheel closes the limit switch 90, the limit switch 91 being again closed only when the wheel reaches a centralized position over the piston assembly 43.

When pressure builds up in the cylinder 42 to the resistance of wheel engagement with the sealing ring 52, a pressure switch, not shown, actuates a solenoid valve 94 admitting pressure from an accumulator, not shown, through the flexible hose 95 leading to the inflation port 62. A limit switch 96 mounted on the stationary frame member 28 is engaged by a cam 97 mounted on the frame C as such frame nears the end of its travel in the conveyor direction, such limit switch serving to reverse the solenoid 94 to exhaust the air pressure through port 62 through an adjustable orifice check valve 98 which permits free flow inflation but restricted release of pressure of pressure in order to prevent an overly sudden final seating of the tire bead which would otherwise occur with a somewhat explosive noise and excessive jarring of the inflating mechanism. A further limit switch 99 when contacted by the cam 97 initiates lowering of the wheel as the frame C and inflation mechanism reach the end of their travel in the direction of conveyor travel. Limit switch 100 actuated by the cam surface 97a upon completion of the return travel of the frame C serves as a safety switch in series with limit switches 90 and 91 to assure the coordinated location of a wheel and the inflating mechanism before actuation of the piston assembly 43 can take place.

Operation

From the above description of the various component parts, the construction and operation of the present automatic tubeless tire inflating machine will be readily understood by those skilled in the art. A summary of the operation includes the movement of a wheel by conveyor 20 into a position under the momentarily stationary inflating mechanism as shown in Fig. 1 whereupon limit switches 90, 91 simultaneously closed by leading and trailing edges 92, 93 of the wheel initiate actuation of the piston assembly 43 raising the wheel centralized by the beveled surfaces 47 and registration with the wheel flange 48 and by engagement of the wheel hub 51 with the guide surface 50, the wheel being raised until the upper rim contacts the rubber sealing ring 52 whereupon pressure built up against the piston assembly 43 actuates the solenoid 94 to admit air pressure into the port 62.

As inflation of the tire begins the upper side wall is held in a depressed position as shown in dotted line at 60 by the weight of the floating cylinder 36 so as to admit air pressure from the inside of annular pressure ring supplied by port 62 past the tire bead 61 and wheel flange 63 into the inner cavity of the tire, the lower tire bead being firmly set by the initial inflation pressure, (e.g., in the order of 5 p.s.i.) if it is not in a fully seated position as the inflation begins. As the pressure rapidly builds up inside the tire through the large opening provided therefor, the inside pressure acting on the unsupported area of the tire casing subjected only to atmospheric pressure outside the cylinder overcomes the weight of the cylinder 36, 37 as well as the inflating pressure operating on the annular shoulder area 65 to bring the tire bead 61 into sealing position with the flange 63 as shown in solid line Fig. 4 whereafter no further inflation of the tire will take place.

During the inflation cycle thus far described, starting immediately after the actuation of the piston assembly 43, the frame C and inflating apparatus mounted thereon will be moved in the direction of conveyor travel by engagement of drive roller 74d with drive dog 75 and a connected drive bar 77, the roller 74d being mounted on the drive chain 73 propelled by sprocket 72, drive shaft 71 and sprocket 70, in turn driven by conveyor chains 20. This portion of the cycle up to the point of the tire bead 61 moving into sealing engagement with the flange 63 will consume approximately 2 seconds from the time of actuation of the limit switches 90, 91 and approximately two-thirds of the forward travel of the frame C. As the frame C now continues to advance, cam 97 mounted thereon closes limit switch 96 reversing solenoid valve 94 and releasing air pressure through an orifice check valve 98 communicating with port 62. The gradual release of pressure within the cylinder 36 above the tire casing permits the pressure within the tire to further raise the cylinder 36 and move the tire bead 61 into final seated position against the flange 64 whereupon actuation of the limit switch 99 by cam 97 effects a release of air pressure from the cylinder 42 and a lowering of the wheel back onto the conveyor chains 20.

At this time, with reference to Fig. 10, roller 85 dropping into the recess 84 will permit the roller 74d to move out of engagement with the drive dog 75 terminating the forward movement of the frame C and inflating mechanism mounted thereon and the immediately subsequent engagement of the roller 74a with the drive dog 76 will initiate the return movement to the starting position whereupon after a momentary dwell of the frame C in a stationary return position, a succeeding wheel will come into position under the inflating mechanism again actuating the limit switch 90 and 91 repeating the tire inflating cycle.

In a typical automotive production assembly operation wherein 500 wheels per hour come off a tire mounting machine calling for the inflation of tires at the rate of 7 2/10 seconds per tire, a single tire inflating machine as described above has been found capable of handling directly the entire output of the tire mounting machine. Since the inflation cycle per se involves approximately 3 seconds (one second for raising the wheel, one second for inflation and one second for lowering the wheel) and the return of the inflating mechanism frame to starting position likewise consumes approximately 3 seconds, a dwell period of approximately 1 2/10 seconds is provided which is ample to compensate in any variation of spacing in adjacent wheels delivered by frictional drag on the conveyor chains 20.

It will be understood that while the automatic conveyor feed and coordinated shuttle movement of the inflation mechanism per se are desirable for maximum automation and production capacity, nevertheless a highly useful stationary tubeless tire inflating machine may be provided employing the present inflating apparatus such as mounted on the frame C, such machine utilizing hand loading or other means for delivering wheel mounted uninflated tires to the machine and for removal after inflation.

It will be further understood that numerous modifications in details of construction might be resorted to without departing from the scope of my invention as defined in the following claims.

I claim:

1. A device for introducing air under pressure into a rim-mounted tubeless tire comprising first annular sealing means adapted to engage a wheel rim, a rigid cylinder, second annular sealing means on said cylinder adapted to engage the adjacent side wall of a tubeless tire, means including said first and second sealing means defining an inflation chamber, means for creating a superatmospheric pressure in said chamber, said rigid cylinder being axially movable with respect to the rim-engaging sealing means and adapted to hold the bead of said side wall out of engagement with said rim to permit air pressure to flow from said chamber to the inside of said tire.

2. A device as set forth in claim 1 wherein said side wall engaging sealing means has a diameter intermediate the tread and bead diameters of said tire such as to provide a side wall pressure area within the tire unbalanced by superatmospheric pressure on the exterior of said side wall sufficient to actuate said rigid cylinder.

3. A device as set forth in claim 1 wherein said side wall engaging sealing means comprises a thin edge on said cylinder for contacting said side wall to facilitate development of an air seal across any raised lettering on the side wall contacted by said cylinder.

4. A device as set forth in claim 1 including means acting on said cylinder to maintain the cylinder in floating engagement with said side wall.

5. A device as set forth in claim 1 wherein the side wall sealing means has a smaller diameter than the main internal diameter of said cylinder with a joining wall of differential area acted upon by said super-atmospheric pressure.

6. A device as set forth in claim 1 wherein a ring is provided to carry said wheel rim engaging sealing means, and another annular sealing means is provided between said ring and the inner wall of said cylinder.

7. The combination of claim 1 including a pressure cylinder and piston for holding a wheel and said wheel rim engaging sealing means in positive sealing engagement.

8. The combination of claim 1 including a pressure cylinder and piston for holding a wheel and said wheel rim engaging sealing means in positive sealing engagement, and pressure switch means responsive to the build-up of pressure in said piston cylinder means adapted to initiate the admission of tire inflating pressure to said tire side wall.

9. The combination of claim 7 wherein conveyor means is provided to move a wheel with a tire loosely mounted thereon to a position over said piston cylinder, and wherein limit switch means engageable by said wheel are adapted to initiate actuation of said piston cylinder means raising said wheel off of said conveyor means.

10. The combination of claim 7 wherein conveyor means is provided to move a wheel with a tire loosely mounted thereon to a position over said piston cylinder, and wherein limit switch means engageable by said wheel are adapted to initiate actuation of said piston cylinder means raising said wheel off of said conveyor means, means being provided to move said tire inflating device along the path of said conveyor during inflation of said tire, and to return said tire inflating device to its original position after return of said wheel to said conveyor means.

11. The combination of claim 7 wherein conveyor means is provided to move a wheel with a tire loosely mounted thereon to a position over said piston cylinder, and wherein limit switch means engageable by said wheel are adapted to initiate actuation of said piston cylinder means raising said wheel off of said conveyor means, means being provided to move said tire inflating device along the path of said conveyor during inflation of said tire, and to return said tire inflating device to its original position after return of said wheel to said conveyor means, said means for moving said tire inflating apparatus being power driven from said conveyor means, and including an endless chain having reciprocating dog means alternately engaged by the opposite reaches of said endless chain.

12. The combination of claim 7 wherein conveyor means is provided to move a wheel with a tire loosely mounted thereon to a position over said piston cylinder, and wherein limit switch means engageable by said wheel are adapted to initiate actuation of said piston cylinder means raising said wheel off of said conveyor means, means being provided to move said tire inflating device along the path of said conveyor during inflation of said tire, and to return said wheel with inflated tire to said conveyor upon completion of inflation, said means for returning said wheel to said conveyor being responsive to the travel of said tire inflating apparatus to a predetermined position along said conveyor means.

13. The combination of claim 7 wherein conveyor means is provided to move a wheel with a tire loosely mounted thereon to a position over said piston cylinder, and wherein limit switch means engageable by said wheel are adapted to initiate actuation of said piston cylinder means raising said wheel off of said conveyor means, means being provided to move said tire inflating device along the path of said conveyor during inflation of said tire, and means being provided for releasing superatmospheric pressure from the exterior of said side wall in response to the movement of said tire inflating apparatus to a predetermined position in its travel along said conveyor means.

14. In a tubeless tire inflating machine, a stationary annular sealing means adapted to be engaged by a wheel rim, piston cylinder means for moving a wheel rim into positive sealing engagement with said sealing means, a stationary ring carrying said sealing means, a rigid cylinder mounted for axial movement relative to said annular ring, means for moving said rigid cylinder, an annular seal interposed between said ring and rigid cylinder, an edge on said rigid cylinder adapted to sealingly engage the side wall of a tubeless tire loosely mounted on said wheel, and resilient means for establishing a limited pressure between said rigid cylinder and said side wall sufficient to set the bead of the opposite side wall into contact with its wheel rim and to hold the bead of the side wall contacted by said rigid cylinder out of engagement with its wheel rim without forcing said tire bead into engagement with the opposite tire bead.

15. A device for introducing air into a tubeless tire comprising first annular sealing means adapted to engage a wheel rim, second relatively movable rigid annular sealing means adapted to engage the adjacent side wall of a tubeless tire, means including said first and second sealing means defining an inflation chamber exteriorly of said tire, means for creating a superatmospheric pressure in said chamber, said second sealing means being adapted to hold the sealing bead of said side wall out of engagement with said rim to provide an annular passage between said sealing means for the flow of air pressure from said chamber to the interior of said tire, and air pressure introduced into the interior of said tire forcing said sealing bead into engagement with said rim against the holding action of said second means.

16. A tubeless tire inflating device comprising an annular seal ring adapted to engage the rim of a wheel, annular means adapted to engage an adjacent side wall of a tubeless tire intermediate the bead and the tread thereof and in sealing engagement therewith, means for urging said annular means axially of the wheel away from said seal ring to deflect the corresponding bead of the tire away from said rim, means including said ring and said annular means defining an inflation chamber communicating with the interior of the tire through the annular space between the deflected bead and the rim, and means for introducing air under pressure into said chamber and through said annular space into the interior of said tire, the air pressure introduced into said tire moving the bead into contact with said rim to cut off communication of the interior of the tire with said chamber when a predetermined inflation pressure is attained.

References Cited in the file of this patent

UNITED STATES PATENTS

| | | |
|---|---|---|
| 2,304,581 | Lyon | Dec. 8, 1942 |
| 2,406,771 | Hughes | Sept. 3, 1946 |
| 2,418,849 | Polt | Apr. 15, 1947 |
| 2,488,376 | Clauser | Nov. 15, 1949 |
| 2,615,506 | Wilson | Oct. 28, 1952 |
| 2,635,682 | Rerick et al. | Apr. 21, 1953 |
| 2,661,053 | Mullen | Dec. 1, 1953 |
| 2,665,747 | Harrison | Jan. 12, 1954 |